(12) United States Patent
Farnsworth et al.

(10) Patent No.: US 7,996,010 B2
(45) Date of Patent: Aug. 9, 2011

(54) APPARATUS AND METHOD FOR QUERYING FOR RAT HANDOVER SYSTEM INFORMATION IN MOBILE TELECOMMUNICATIONS SYSTEMS

(75) Inventors: Andrew Farnsworth, Marlbrook (GB); Mark Dennis Norton, Bromsgrove (GB); Gideon Roberts, Stone (GB)

(73) Assignee: Research In Motion Limited, Waterloo, Ontario (CA)

( * ) Notice: Subject to any disclaimer, the term of this patent is extended or adjusted under 35 U.S.C. 154(b) by 372 days.

(21) Appl. No.: 11/265,542

(22) Filed: Nov. 2, 2005

(65) Prior Publication Data

US 2007/0099615 A1   May 3, 2007

(51) Int. Cl.
*H04W 36/00* (2009.01)
(52) U.S. Cl. ......................................... 455/436; 455/437
(58) Field of Classification Search .................. 455/436, 455/437
See application file for complete search history.

(56) References Cited

U.S. PATENT DOCUMENTS

| | | | | |
|---|---|---|---|---|
| 5,457,810 | A * | 10/1995 | Ivanov et al. ................ | 455/441 |
| 6,628,946 | B1 * | 9/2003 | Wiberg et al. ................ | 455/434 |
| 7,079,840 | B2 * | 7/2006 | Roberts et al. ............... | 455/434 |
| 7,245,919 | B2 * | 7/2007 | Lau et al. ...................... | 455/450 |
| 7,251,490 | B2 * | 7/2007 | Rimoni ......................... | 455/436 |
| 7,437,178 | B2 * | 10/2008 | Jeong et al. ................... | 455/525 |
| 7,444,142 | B2 * | 10/2008 | Roberts et al. ............... | 455/418 |
| 2001/0055969 | A1 * | 12/2001 | Bonta et al. .................. | 455/436 |
| 2003/0040331 | A1 * | 2/2003 | Zhao ............................. | 455/552 |
| 2003/0152049 | A1 * | 8/2003 | Turner .......................... | 370/331 |
| 2003/0218995 | A1 * | 11/2003 | Kim et al. ..................... | 370/318 |
| 2004/0266435 | A1 * | 12/2004 | de Jong et al. ............... | 455/436 |
| 2005/0014507 | A1 * | 1/2005 | Iimori .......................... | 455/450 |
| 2005/0043034 | A1 * | 2/2005 | Abdel-Ghaffar et al. ..... | 455/453 |
| 2005/0096050 | A1 * | 5/2005 | Hidaka ......................... | 455/436 |
| 2005/0177623 | A1 | 8/2005 | Roberts et al. | |
| 2005/0213540 | A1 * | 9/2005 | Matsumoto ................... | 370/331 |
| 2007/0049344 | A1 * | 3/2007 | Van Der Velde et al. ..... | 455/560 |

FOREIGN PATENT DOCUMENTS

| | | |
|---|---|---|
| EP | 1 519 606 A | 3/2005 |
| EP | 1 553 798 A | 7/2005 |
| EP | 1 562 387 A | 8/2005 |

\* cited by examiner

*Primary Examiner* — Rafael Pérez-Gutiérrez
*Assistant Examiner* — Allahyar Kasraian
(74) *Attorney, Agent, or Firm* — Novak Druce + Quigg LLP

(57) ABSTRACT

A mobile telecommunications system comprises a network of a plurality of cells and at least one user equipment device operable to communicate in the system and to operate in a first RAT and a second RAT. The method comprises, in the user equipment device, determining whether the validity of data stored on the user equipment device will expire within an expiry period, the stored data being for use in handover of operation of the user equipment device from the first RAT to the second RAT.

2 Claims, 6 Drawing Sheets

APPARATUS AND METHOD FOR QUERYING FOR RAT HANDOVER SYSTEM INFORMATION IN MOBILE TELECOMMUNICATIONS SYSTEMS

BACKGROUND

1. Technical Field

This application relates to mobile telecommunications systems, for example UMTS (Universal Mobile Telecommunications System), in general and to an apparatus and method for determining whether validity of RAT (Radio Access Technology) handover information in mobile telecommunications system user equipment will remain valid to allow handover from one RAT to another.

2. Description of the Related Art

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

In a typical cellular radio system, mobile user equipment (UE) communicates via a radio access network (RAN) to one or more core networks. User equipment (UE) comprises various types of equipment such as mobile telephones (also known as cellular or cell phones), lap tops with wireless communication capability, personal digital assistants (PDAs) etc. These may be portable, hand held, pocket sized, installed in a vehicle etc. and communicate voice and/or data signals with the radio access network.

The radio access network covers a geographical area divided into a plurality of cell areas. Each cell area is served by at least one base station, which may be referred to as a Node B. Each cell is identified by a unique identifier which is broadcast in the cell. The base stations communicate at radio frequencies over an air interface with the UEs within range of the base station. Several base stations may be connected to a radio network controller (RNC) which controls various activities of the base stations. The radio network controllers are typically connected to a core network.

UMTS is a third generation public land mobile telecommunication system. Various standardization bodies are known to publish and set standards for UMTS, each in their respective areas of competence. For instance, the 3GPP (Third Generation Partnership Project) has been known to publish and set standards for GSM (Global System for Mobile Communications) based UMTS, and the 3GPP2 (Third Generation Partnership Project 2) has been known to publish and set standards for CDMA (Code Division Multiple Access) based UMTS. Within the scope of a particular standardization body, specific partners publish and set standards in their respective areas.

Consider a wireless mobile device, generally referred to as user equipment (UE), that complies with the 3GPP specifications for the UMTS protocol. The 3GPP 25.331 specification, referred to herein as the 25.331 specification, addresses the subject of UMTS RRC (Radio Resource Control) protocol requirements between the UMTS Terrestrial Radio Access Network (UTRAN) and the UE.

Clause 8.1.1 of the 25.331 specification, relates to the broadcast of system information. The UTRAN—that part of a UMTS network which consists of one or more RNC and one or more Node B between Iu and Uu interfaces—sends system information to a UE by means of a message that comprises a Master Information Block (MIB) and a plurality of System Information Blocks (SIBs). The MIB provides references and scheduling information for a number of system information blocks. A system information block groups together system information elements (IEs) of the same nature. Different system information blocks may have different characteristics, e.g. regarding their repetition rate and the requirements on UEs to re-read the system information blocks. The system information blocks contain the actual system information. The master information block may optionally also contain reference and scheduling information to one or two scheduling blocks, which give references and scheduling information for additional system information blocks. Scheduling information for a system information block is included in either the master information block or one of the scheduling blocks.

When a UMTS cell is selected by a mobile device, the master information block (MIB) is read on the broadcast control channel (BCCH) followed by the appropriate system information blocks (SIBs).

If the Universal Terrestrial Radio Access Network (UTRAN) needs to change any of the system information blocks, it informs the mobile devices (UEs) in the cell. This is achieved by the UTRAN sending SYSTEM INFORMATION as illustrated generally in FIG. 1. Upon modification of system information blocks using value tags, UTRAN notifies the new value tag for the master information block in the IE "BCCH modification info". As illustrated in FIG. 2, a message advising this is transmitted to the UE. When the UE is in idle mode, CELL_PCH state and URA_PCH state, the IE "BCCH modification info" is contained in a PAGING TYPE 1 message transmitted on the PCCH in all paging occasions in the cell. When the UE is in CELL_FACH state or TDD UEs in CELL_DCH with S-CCPCH assigned, the IE "BCCH modification info" is contained in a SYSTEM INFORMATION CHANGE INDICATION message transmitted on the BCCH mapped on at least one FACH on every Secondary CCPCH in the cell. Upon reception of a PAGING TYPE 1 message or a SYSTEM INFORMATION CHANGE INDICATION message containing the IE "BCCH modification info" containing the IE "MIB value tag" but not containing the IE "BCCH modification time", the UE performs the actions as specified in subclause 8.1.1.7.3 of the 25.331 specification. If the IE "BCCH modification time" is included the UE shall perform actions as specified in subclause 8.1.1.7.2 of the 25.331 specification.

In part 8.1.1 of the 25.331 standard (for instance, Clauses 8.1.1.1.4, 8.1.1.5 and 8.1.1.6) it is stated that a UE may consider the content of the scheduling block or system information block as valid until it receives the same type of block or at most six hours after reception.

Many user equipment devices in the UTRAN may be configured to operate in more than one radio access technology (RAT), for example the user equipment devices may be configured to operate in GSM as well as UMTS. System Information Block 16 (SIB16) contains radio bearer, transport channel and physical channel parameters to be stored by the user equipment device in idle and connected modes for use during handover to UTRAN. For all SIBs except SIB types 15.2, 15.3 and 16 the content is the same in each occurrence for SIBs using a value tag. SIB types 15.2, 15.3 and 16 may occur more than once (that is, more than one version of these SIBs may be stored on a UE) with different contents. In this case, scheduling information is provided for each such occurrence of these SIBs. SIBs that do not use a value tag may have a different content for each occurrence.

Clause 8.1.1.6.16 of the 25.331 standard defines the requirements for multiple occurrences of SIB16 stored in the UE, one for each predefined configuration for the UE: that is, for each predefined communication mode (voice, data), various data transfer rates, etc. These configurations are defined in clause 10.3.4.5 of the 25.331 specification and numbered 0 . . . 15 (zero to fifteen). A UE configured to operate in more that one RAT may be required to handover its mode of operation from a first RAT (for example, GSM) to a second RAT (for example, UMTS). Such a requirement to hand over may happen in either idle or connected mode. In these circumstances, UTRAN requests of the UE details of which occurrences of SIB16 are stored in the UE, so UTRAN can select one of these for use in the handover. The SIB16s are stored in the UE in the form of an identifier (ID) for each occurrence of the SIB16 (a four-bit number) along with the SIB16 configuration data itself (comprising of the order of 100 bytes of data). The request by UTRAN is sent in the form of a Inter RAT Handover Info (IRHI) request message, the response to which is generally illustrated in FIG. 3. This response is implemented by the UE transmitting to UTRAN details of the SIB16s stored on the UE (which may include an ID for the SIB16s). As the UE is operating in a RAT other than UMTS, the IRHI request and response thereto must be transmitted via the other RAT, in this example, GSM.

Upon receipt of a IRHI message from the UE, UTRAN then selects which of the SIB16s is to be used in the handover. UTRAN chooses an appropriate configuration for an inter-RAT handover depending on any or all of a number of factors, including the capabilities of the UE, the purpose of the connection and the loading on UTRAN. Following this, UTRAN instructs the UE to use the selected occurrence of SIB16, communicating the reference number/identifier 0 . . . 15 of the selected SIB16 to the UE to use that SIB16 when executing the handover.

During execution of a RAT handover, problems may occur when, for example, the UE informs UTRAN that SIB16_7 (that is, an occurrence of the eighth type of SIB16 for an eighth predefined configuration of operation of the UE) is stored on the UE. However, situations may arise when the validity of that occurrence of SIB16 is about to expire, but UTRAN is unaware of this and proceeds to instruct the UE to execute a RAT handover using that particular SIB16 at a time after which the validity of SIB16_7 has expired. In such a circumstance, the UE is required to reject the handover attempt and send a handover failure message to the GSM Edge Radio Access Network (GERAN) on the GSM interface. UTRAN may then proceed in any of a number of different ways. For instance, UTRAN may instruct the UE to execute an RAT handover using a default configuration which does not expire, or it may send a further request for IRHI, in which case the UE will respond by re-transmitting further information relating to valid SIB16s stored on the UE for UTRAN to choose. However, there is again the risk that UTRAN will select an SIB16 which is about to expire and, if the UE is instructed to handover using an SIB16 which has then expired, the UE is required to reject the handover attempt and send a handover failure message to GERAN.

A possible partial solution to this problem arising in such situations is to avoid allowing the SIBs to expire by utilising the methods and apparatus of commonly-assigned U.S. patent application Ser. No. 10/775,030 and European Patent Publication No. 1562387. If an SIB is set to expire six hours after it is read, then re-reading it, say, five hours after being previously read means that it will then be valid for another six hours. Thus, the SIB will never expire if the process is repeated in this manner. However, if the SIB is unable to be re-read, then problems might arise. For instance, if no UMTS coverage is available until after a communication on the UE has commenced, trying to prevent SIB16s expiring will be unsuccessful as it is may not be possible for some UE devices to read SIBs during a call.

There are therefore proposed strategies for determining whether RAT handover information will remain valid within an expiry period. A number of such strategies are detailed below.

Other aspects and features of the present invention will become apparent to those ordinarily skilled in the art upon review of the following description of specific embodiments of an apparatus and method for querying for RAT handover information in mobile telecommunications systems such as UMTS.

BRIEF DESCRIPTION OF THE DRAWINGS

Embodiments of the present invention will now be described, by way of example only, with reference to the attached drawings, in which.

The same reference numerals are used in different figures where appropriate to denote similar elements.

DETAILED DESCRIPTION OF THE DRAWINGS

A method and apparatus for querying for RAT handover data is described. In the following description, for the purposes of explanation, numerous specific details are set forth in order to provide a thorough understanding of the present invention. It will be apparent, however, to one skilled in the art that the present invention may be practised without these specific details. In other instances, well-known structures and devices are shown in block diagram form in order to avoid unnecessarily obscuring the present invention.

The needs identified in the foregoing Background, and other needs and objects that will become apparent from the following description, are achieved by, in one aspect, a method for querying for RAT handover data in a mobile telecommunications device. In other aspects, the invention encompasses apparatus and a computer-readable medium configured to carry out the foregoing steps. In particular, the method may be implemented in a mobile telecommunications device, with or without voice capabilities, or other electronic devices such as handheld or portable devices and/or within the network.

Figure 1:
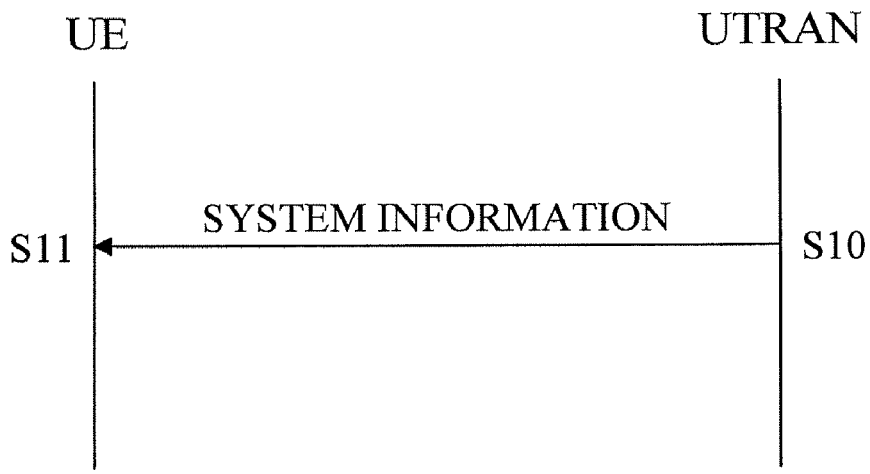
FIG. 1 illustrates the broadcast of system information in a UMTS system.
Figure 2:
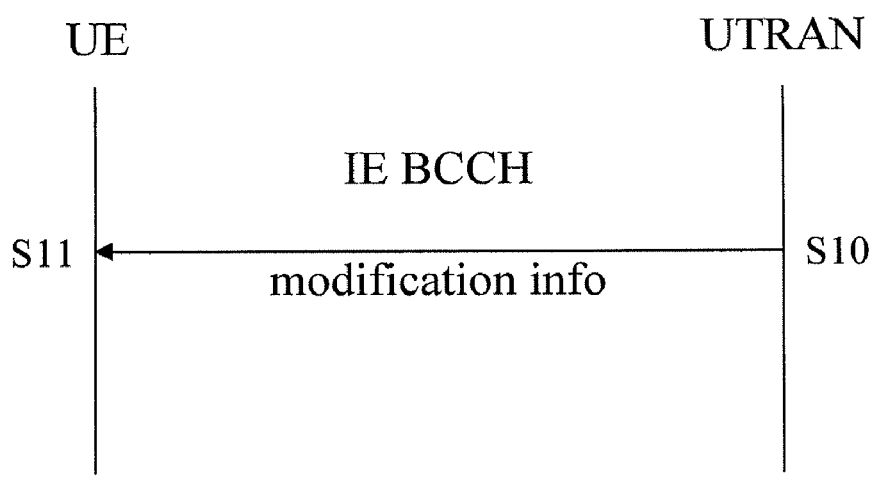
FIG. 2 illustrates notification of a IE BCCH modification info. message.
Figure 3:
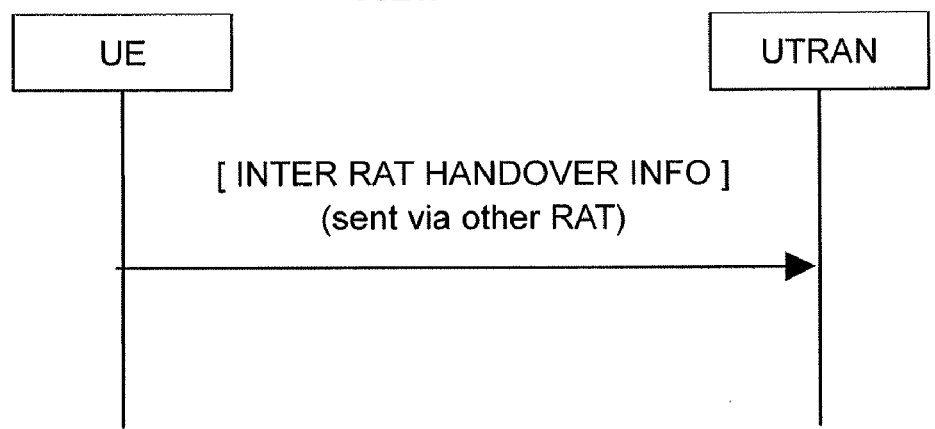
FIG. 3 illustrates a request for Inter RAT Handover Information from UTRAN to UE.
Figure 4:
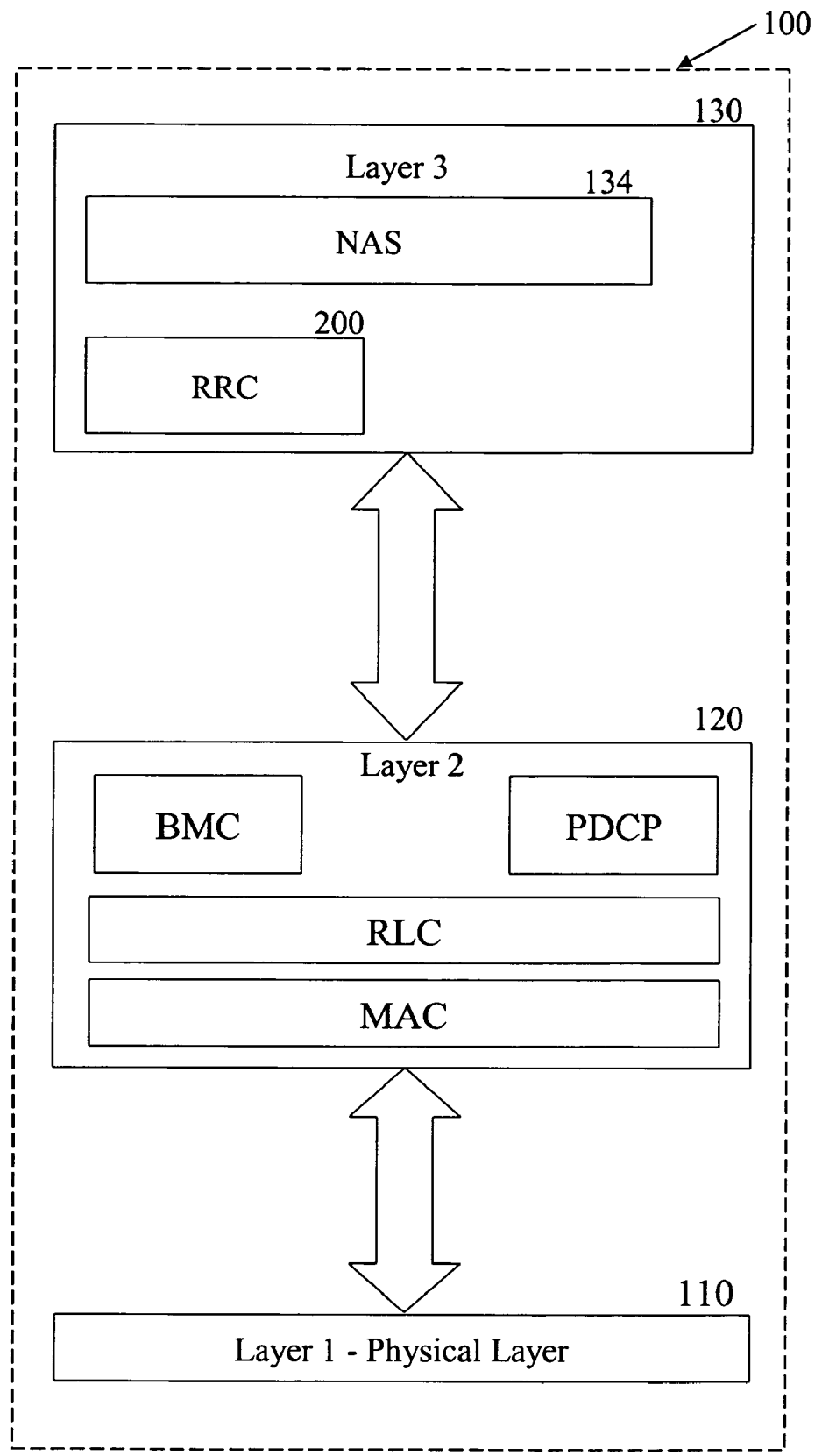
FIG. 4 is a block diagram illustrating an embodiment of a protocol stack apparatus.

Referring to the drawings, FIG. 4 is a block diagram illustrating an embodiment of a protocol stack apparatus provided with a RRC block, in accordance with the present application.

The RRC block 200 is a sub layer of Layer 3, 130 of a UMTS protocol stack 100. The RRC 200 exists in the control plane only and provides an information transfer service to the non-access stratum NAS 134. The RRC 200 is responsible for controlling the configuration of radio interface Layer 1, 110 and Layer 2, 120. When the UTRAN wishes to change the UE configuration it will issue a message to the UE containing a command to invoke a specific RRC procedure. The RRC 200 layer of the UE decodes this message and initiates the appropriate RRC procedure. Generally when the procedure has been completed (either successfully or not) then the RRC sends a response message to the UTRAN (via the lower layers) informing the UTRAN of the outcome. It should be noted that there are a few scenarios where the RRC will not issue a response message to the UTRAN and, in those cases the RRC need not and does not reply.

The conditions for initiation of the inter RAT handover information transfer procedure are defined in clause 8.1.16.2 of the 25.331 standard and may be initiated when the UE is operating in a RAT other than UMTS for example, GSM by:

Using radio access technology-specific procedures, the RAT orders the UE to provide the IRHI message or when the other RAT configures the UE to send the IRHI message upon system specific conditions not involving an explicit order; for example early classmark sending upon entering connected mode or when in connected mode using the other RAT, the IRHI changes compared with what has previously been sent via the other radio access technology.

Figure 5:
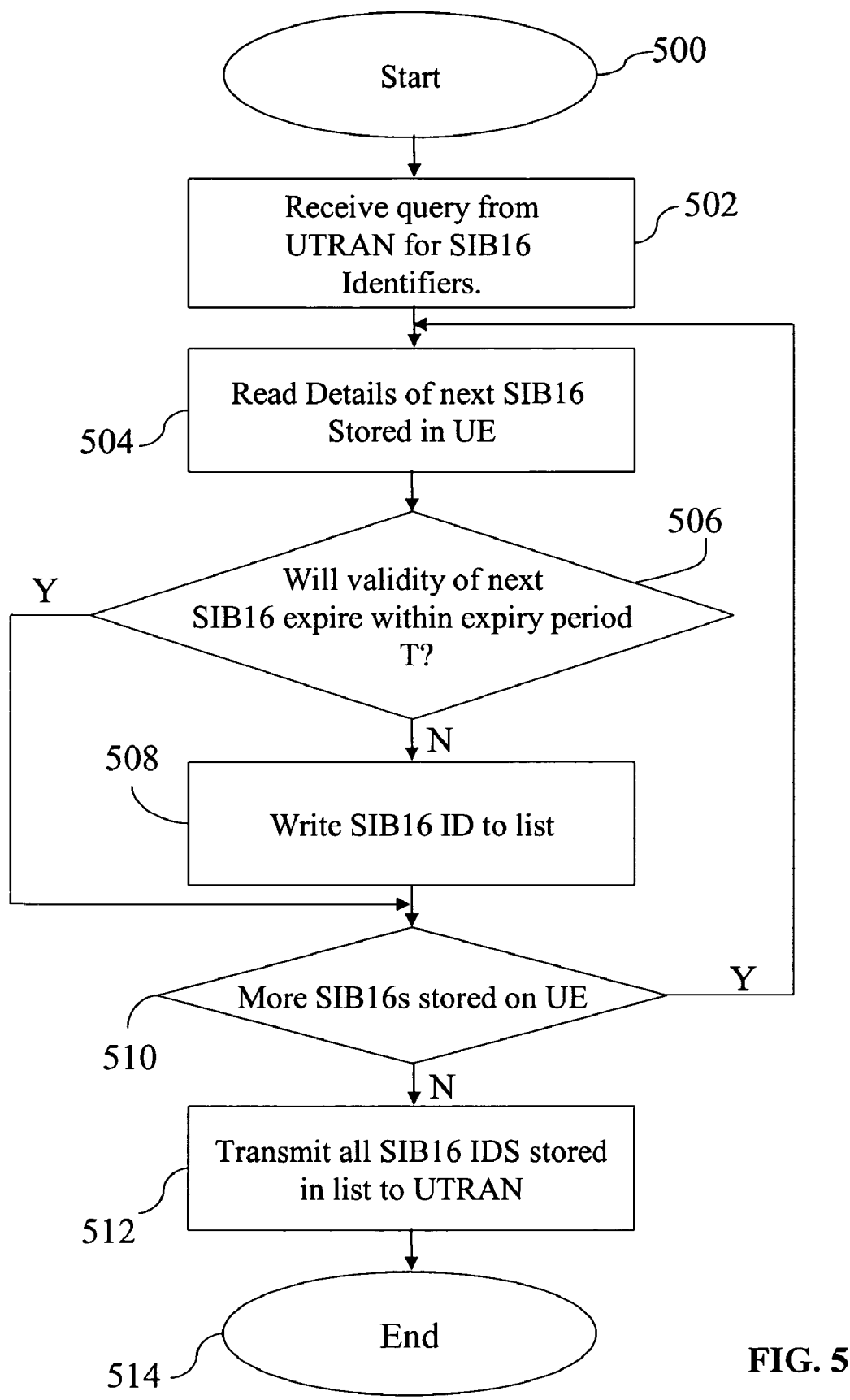
FIG. 5 is a flowchart illustrating implementation of an embodiment of the present invention.

FIG. 5 is a flow diagram which illustrates implementation of a first embodiment of the invention in a UE. The process starts at step 500 and, at optional step 502, the UE receives from the alternative RAT, a request to send an IRHI message. This request includes a request for identifiers for occurrences of the SIB16s stored on the UE. At step 504, the UE reads the details of the first or next SIB16 determined by the UE to be stored in the UE. At step 506, the UE determines whether validity of the read SIB16 will expire within an expiry period T. In embodiments, the expiry period is a predetermined time period. Determination of the expiry period is discussed further in relation to FIG. 7 below. If the UE finds that the SIB16 will be valid after expiry of the expiry period T, the UE writes the ID for that SIB16 (for example, the ID for SIB16_4) to a list which is compiled for transmission to UTRAN in the IRHI message. If the UE determines at step 506 that the validity of the read SIB16 will expire within the expiry period T, identifier details of the SIB16 are not written to the list. In essence, the UE treats that SIB16 as having expired already and is therefore not to be transmitted to UTRAN in the IRHI message.

At step 510, the process determines whether more occurrences of SIB16 are stored on the UE. If the UE finds that more SIB16s are stored, the process loops around steps 504, 506, 508 and 510 until the UE determines no more occurrences of SIB16 which have not yet been read are stored on the UE. At step 512, the UE transmits to UTRAN via the alternative RAT portions of the data stored on the UE in the form of identifiers for all occurrences of SIB16 stored on the UE which are found will not expire within the expiry period T. That is, the UE transmits to UTRAN four bits of data for each ID and a further four bits (0 . . . 15) of data to indicate to UTRAN the total number of occurrences of SIB16 stored on the UE. The process ends at step 514. Accordingly, UTRAN then makes a selection of the occurrence of SIB16 to be used in the handover. The situation whereby the UE is instructed by UTRAN to execute an inter-RAT handover with an occurrence of an SIB16 which has already expired is thus avoided as UTRAN does not receive details of an occurrence of SIB16 which will expire within the expiry period.

Figure 6:
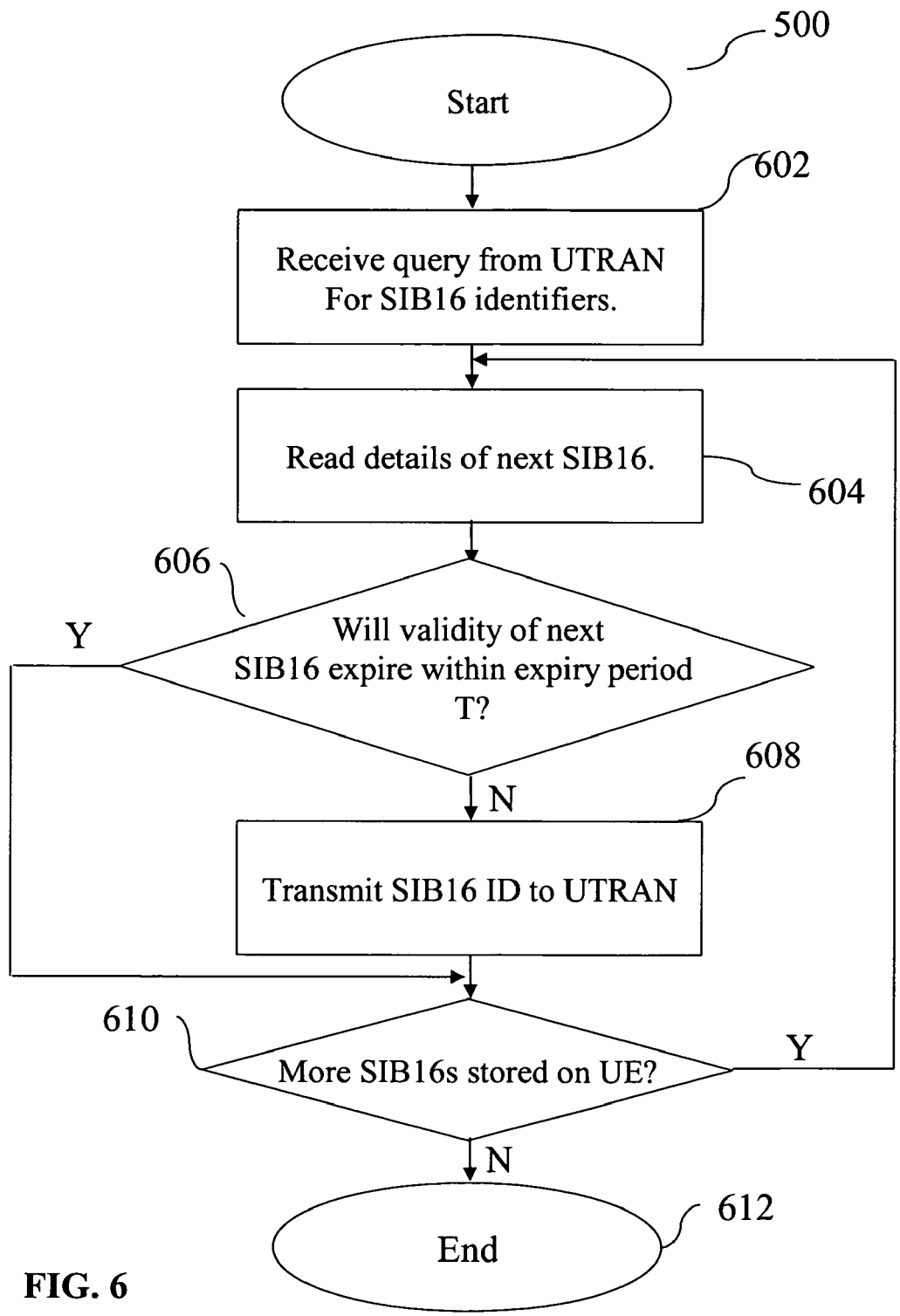
FIG. 6 is a flow chart illustrating implementation of an alternative embodiment of the present invention.

FIG. 6 is a flow diagram illustrating implementation of an alternative embodiment of the invention. The procedure begins at step 600 and, at optional step 602, the UE receives from the alternative RAT, a request to send the IRHI message. This includes a request for identifiers for the SIB16s stored on the UE. At step 604, the UE reads the details of the first or next SIB16 determined by the UE to be stored in the UE. At step 606, the UE determines whether the validity of the SIB16 which has been read will expire within an expiry period T. If the UE determines that the validity of the SIB16 in question will remain valid after expiry of the expiry period, the UE transmits to UTRAN a portion of the data stored on the UE in the form of identifier for the SIB (for example, the ID for SIB16_4) at step 608. If the UE determines at step 606 that the validity of the read SIB16 will expire within the expiry period T, the UE treats that occurrence of SIB16 as having expired already and does not transmit an identifier for that occurrence to UTRAN and the process carries on at step 610 where the UE determines whether any further occurrences of SIB16 are stored upon it. If more SIB16s are stored, the procedure loops around steps 604, 606, 608 and 610 until no more occurrences of SIB16 are detected on the UE at which point the process ends at 612.

In embodiments of the invention, the expiry period may be based, in whole or in part, on a random element. For example, the expiry period may be set as a time period comprising a randomly or pseudo-randomly generated variable element.

Figure 7:
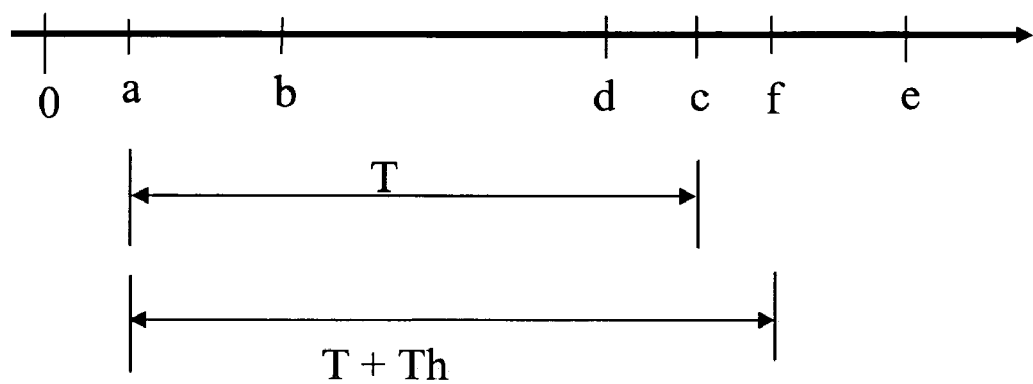
FIG. 7 is a timing diagram illustrating operation of the system in accordance with embodiments of the invention.

FIG. 7 is a time line which illustrates operation of embodiments of the invention. Point 0 is a reference point in the time line. At time point a, the UE receives a request to send to UTRAN an IRHI message. In the time between points a and b in the time line, embodiments of the invention (for example as described with relation to FIGS. 5 and 6 above) determine SIB16 IDs to be transmitted to UTRAN. Typically, if a Handover To UTRAN (HOTU) message (the instruction from UTRAN to the UE to execute a handover from a first RAT to a second RAT) will be received at the UE within 30 seconds from receipt at the UE of a request for a IRHI message, then the expiry period T could be set to a predetermined time period of 30 seconds. On the timeline, point c is the point at which the UE receives the HOTU instruction and the expiry period T is the time between points a and c on the timeline. By way of illustration of an advantage provided by embodiments of the present invention, if it is determined by, for example, the embodiment of the invention illustrated in and described in relation to FIG. 5 above that validity of the SIB16 in question (e.g. SIB16_7) will expire at the point d on the timeline then, by implementing an embodiment of the invention, the UE is able to determine that at point c (the time when the UE anticipates or can expect it will receive the HOTU instruction), SIB16_7 will already be invalid. Upon this determination, embodiments of the invention refrain from transmitting to UTRAN an ID for SIB16_7 in the IRHI message. If, in making the determination, the UE determines that the validity of SIB16_7 will not have expired by time point c and will not expire until, say, point e in the timeline, then the UE transmits to UTRAN an ID for SIB16_7 in the IRHI message.

Additionally or optionally, embodiments of the invention may allow a further safe guard period to be built in while making this determination. Such an allowance could be made for any delay in actually executing the handover from the first RAT to the second RAT. Again, referring to FIG. 7, the safe guard time threshold, Th may be added to expiry period T to allow for any time delay in execution of the handover. Thus, the UE may be able to determine that when the handover is actually executed, the SIB16 selected by UTRAN for the handover remains valid.

In the embodiments described above, the UE transmits to UTRAN an ID for one or more SIB16s. Alternatively, it may be more efficient for the UE to transmit to UTRAN a list of IDs for SIB16s not stored on the UE. (As mentioned above, there are 16 pre-defined configurations of SIB16 and if, say, more than eight SIB16s are stored on the UE, less data need be transmitted by the UE to UTRAN if transmitting IDs of those SIB16s which are known not to be stored on the UE.) In a further alternative, the UE advises UTRAN of the SIB16s stored on the UE by sending at least a part of each stored SIB16 itself instead of the SIB16 ID. These alternatives may be used alone or in combination to transmit an indication to UTRAN of the occurrences of SIB16 stored on the UE.

In the embodiments described above, the UE determines whether the validity of SIB16s will remain valid after the expiry period in response to the IRHI request from UTRAN. The UE will also determine whether the validity of the SIB16 will remain valid after the expiry period in other circumstances including: in response to a change in network conditions, or to a change in status of the UE itself, or responsive to an update of the SIB16 or MIB or recognition or anticipation by the UE that an update of the SIB16/MIB is scheduled to take place soon.

Figure 8:
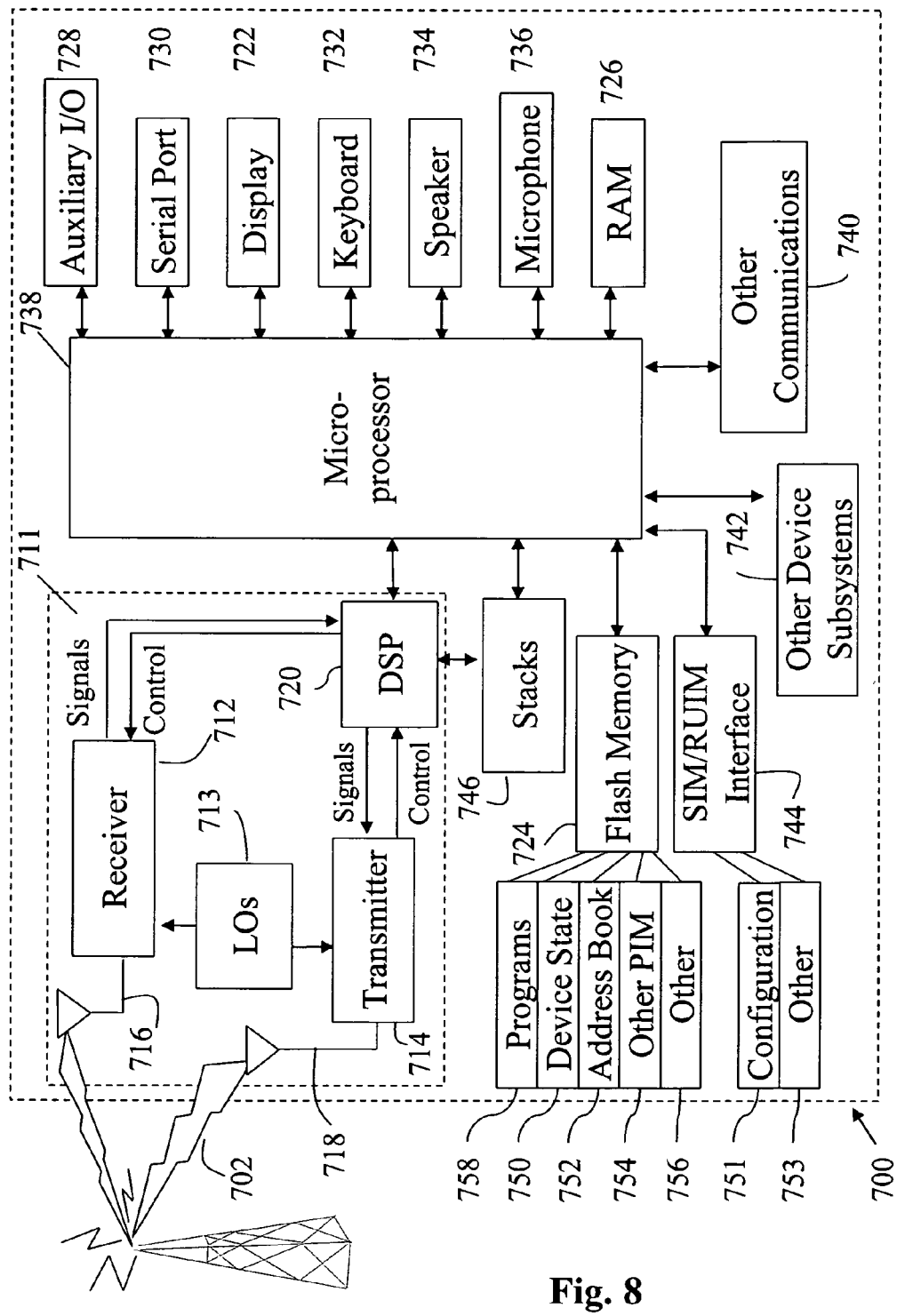
FIG. 8 is a block diagram illustrating a mobile device, which can act as a UE and co-operate with the apparatus and methods of FIGS. 1 to 7.

Turning now to FIG. 8, FIG. 8 is a block diagram illustrating a mobile device, which can act as a UE and co-operate with the apparatus and methods of FIGS. 1 to 7, and which is an exemplary wireless communication device. Mobile station 700 is preferably a two-way wireless communication device having at least voice and data communication capabilities. Mobile station 700 preferably has the capability to communicate with other computer systems on the Internet. Depending on the exact functionality provided, the wireless device may be referred to as a data messaging device, a two-way pager, a wireless e-mail device, a cellular telephone with data messaging capabilities, a wireless Internet appliance, or a data communication device, as examples.

Where mobile station 700 is enabled for two-way communication, it will incorporate a communication subsystem 711, including both a receiver 712 and a transmitter 714, as well as associated components such as one or more, preferably embedded or internal, antenna elements 716 and 718, local oscillators (LOs) 713, and a processing module such as a digital signal processor (DSP) 720. As will be apparent to those skilled in the field of communications, the particular design of the communication subsystem 711 will be dependent upon the communication network in which the device is intended to operate. For example, mobile station 700 may include a communication subsystem 711 designed to operate within the Mobitex™ mobile communication system, the DataTAC™ mobile communication system, GPRS network, UMTS network, or EDGE network.

Network access requirements will also vary depending upon the type of network 702. For example, in the Mobitex and DataTAC networks, mobile station 700 is registered on the network using a unique identification number associated with each mobile station. In UMTS and GPRS networks, however, network access is associated with a subscriber or user of mobile station 700. A GPRS mobile station therefore requires a subscriber identity module (SIM) card in order to operate on a GPRS network. Without a valid SIM card, a GPRS mobile station will not be fully functional. Local or non-network communication functions, as well as legally required functions (if any) such as "911" emergency calling, may be available, but mobile station 700 will be unable to carry out any other functions involving communications over the network 702. The SIM interface 744 is normally similar to a card-slot into which a SIM card can be inserted and ejected like a diskette or PCMCIA card. The SIM card can have approximately 64K of memory and hold many key configuration 751, and other information 753 such as identification, and subscriber related information.

When required network registration or activation procedures have been completed, mobile station 700 may send and receive communication signals over the network 702. Signals received by antenna 716 through communication network 702 are input to receiver 712, which may perform such common receiver functions as signal amplification, frequency down conversion, filtering, channel selection and the like, and in the example system shown in FIG. 8, analog to digital (A/D) conversion. A/D conversion of a received signal allows more complex communication functions such as demodulation and decoding to be performed in the DSP 720. In a similar manner, signals to be transmitted are processed, including modulation and encoding for example, by DSP 720 and input to transmitter 714 for digital to analog conversion, frequency up conversion, filtering, amplification and transmission over the communication network 702 via antenna 718. DSP 720 not only processes communication signals, but also provides for receiver and transmitter control. For example, the gains applied to communication signals in receiver 712 and transmitter 714 may be adaptively controlled through automatic gain control algorithms implemented in DSP 720.

Mobile station 700 preferably includes a microprocessor 738 which controls the overall operation of the device. Communication functions, including at least data and voice communications, are performed through communication subsystem 711. Microprocessor 738 also interacts with further device subsystems such as the display 722, flash memory 724, random access memory (RAM) 726, auxiliary input/output (I/O) subsystems 728, serial port 730, keyboard 732, speaker 734, microphone 736, a short-range communications subsystem 740 and any other device subsystems generally designated as 742.

Some of the subsystems shown in FIG. 8 perform communication-related functions, whereas other subsystems may provide "resident" or on-device functions. Notably, some subsystems, such as keyboard 732 and display 722, for example, may be used for both communication-related functions, such as entering a text message for transmission over a communication network, and device-resident functions such as a calculator or task list.

Operating system software used by the microprocessor 738 is preferably stored in a persistent store such as flash memory 724, which may instead be a read-only memory (ROM) or similar storage element (not shown). Those skilled in the art will appreciate that the operating system, specific device applications, or parts thereof, may be temporarily loaded into a volatile memory such as RAM 726. Received communication signals may also be stored in RAM 726.

As shown, flash memory 724 can be segregated into different areas for both computer programs 758 and program data storage 750, 752, 754 and 756. These different storage types indicate that each program can allocate a portion of flash memory 724 for their own data storage requirements. Microprocessor 738, in addition to its operating system functions, preferably enables execution of software applications on the mobile station. A predetermined set of applications that control basic operations, including at least data and voice communication applications for example, will normally be installed on mobile station 700 during manufacturing. A preferred software application may be a personal information manager (PIM) application having the ability to organize and manage data items relating to the user of the mobile station such as, but not limited to, e-mail, calendar events, voice mails, appointments, and task items. Naturally, one or more memory stores would be available on the mobile station to facilitate storage of PIM data items. Such PIM application would preferably have the ability to send and receive data items, via the wireless network 702. In a preferred embodiment, the PIM data items are seamlessly integrated, synchronized and updated, via the wireless network 702, with the mobile station user's corresponding data items stored or associated with a host computer system. Further applications may also be loaded onto the mobile station 700 through the network 702, an auxiliary I/O subsystem 728, serial port 730, short-range communications subsystem 740 or any other suitable subsystem 742, and installed by a user in the RAM 726 or preferably a non-volatile store (not shown) for execution by the microprocessor 738. Such flexibility in application installation increases the functionality of the device and may provide enhanced on-device functions, communication-related functions, or both. For example, secure communication applications may enable electronic commerce functions and other such financial transactions to be performed using the mobile station 700.

In a data communication mode, a received signal such as a text message or web page download will be processed by the communication subsystem 711 and input to the microprocessor 738, which preferably further processes the received signal for output to the display 722, or alternatively to an auxiliary I/O device 728. A user of mobile station 700 may also compose data items such as email messages for example, using the keyboard 732, which is preferably a complete alphanumeric keyboard or telephone-type keypad, in conjunction with the display 722 and possibly an auxiliary I/O device 728. Such composed items may then be transmitted over a communication network through the communication subsystem 711.

For voice communications, overall operation of mobile station 700 is similar, except that received signals would preferably be output to a speaker 734 and signals for transmission would be generated by a microphone 736. Alternative voice or audio I/O subsystems, such as a voice message recording subsystem, may also be implemented on mobile station 700. Although voice or audio signal output is preferably accomplished primarily through the speaker 734, display 722 may also be used to provide an indication of the identity of a calling party, the duration of a voice call, or other voice call related information for example.

Serial port 730 in FIG. 8, would normally be implemented in a personal digital assistant (PDA)-type mobile station for which synchronization with a user's desktop computer (not shown) may be desirable, but is an optional device component. Such a port 730 would enable a user to set preferences through an external device or software application and would extend the capabilities of mobile station 700 by providing for information or software downloads to mobile station 700 other than through a wireless communication network. The alternate download path may for example be used to load an encryption key onto the device through a direct and thus reliable and trusted connection to thereby enable secure device communication.

Other communications subsystems 740, such as a short-range communications subsystem, is a further optional component which may provide for communication between mobile station 700 and different systems or devices, which need not necessarily be similar devices. For example, the subsystem 740 may include an infrared device and associated circuits and components or a Bluetooth™ communication module to provide for communication with similarly enabled systems and devices.

When mobile device 700 is used as a UE, protocol stacks 746 include apparatus and a method for implementing system information acquisition in mobile telecommunications system user equipment.

Extensions and Alternatives

In the foregoing specification, the invention has been described with reference to specific embodiments thereof. It will, however, be evident that various modifications and changes may be made thereto without departing from the scope of the technique. The specification and drawings are, accordingly, to be regarded in an illustrative rather than a restrictive sense.

It is to be noted that the methods as described have shown steps being carried out in a particular order. However, it would be clear to a person skilled in the art that the order of the evaluation of some steps is immaterial with respect to the operation of the method. The ordering of the steps as described herein is not intended to be limiting.

It is also to be noted that where a method has been described it is also intended that protection is also sought for a device arranged to carry out the method and where features have been claimed independently of each other these may be implemented or claimed together with other claimed features.

The invention claimed is:

1. A method of using data stored in a user equipment (UE), the UE configurable for communicating with a telecommunications network, the UE capable of communication using multiple radio access technologies (RATs), the stored data useable in an inter-RAT handover event, the stored data organized as one or more blocks where each block contains predefined UE configuration data and an ID (identifier), wherein the ID uniquely identifies each block, the method within the UE comprising:

determining for each of the one or more blocks if, at an initial time, the one or more blocks is valid; where the initial time is determined by the receipt of an Inter RAT Handover Info (IRHI) request message;

determining for each of the one or more blocks if, after the passage of a predetermined amount of time T from the initial time, the one or more blocks will still be valid;

transmitting a message to the telecommunications network, the message comprising an indication of each block that it is determined will still be valid;

wherein the predetermined amount of time T is based on the amount of time an inter-RAT handover instruction is normally expected after the initial time; and wherein the predetermined amount of time T further comprises setting the time interval with respect to a second time period corresponding to the expected time taken, after receiving a query, to receive at the user equipment device the instruction to execute the RAT handover and wherein the predetermined amount of time T is set to be greater than the second time period, optionally greater than the second time period plus a threshold period.

2. A method of using data stored in a user equipment (UE), the UE configurable for communicating with a telecommunications network, the UE capable of communication using multiple radio access technologies (RATs), the stored data useable in an inter-RAT handover event, the stored data organized as one or more blocks where each block contains predefined UE configuration data and an ID (identifier), wherein the ID uniquely identifies each block, the method within the UE comprising:

determining for each of the one or more blocks if, at an initial time, the one or more blocks is valid; where the initial time is determined by the receipt of an Inter RAT Handover Info (IRHI) request message;

determining for each of the one or more blocks if, after the passage of a predetermined amount of time T from the initial time, the one or more blocks will still be valid;

transmitting a message to the telecommunications network, the message comprising an indication of each block that it is determined will still be valid;

wherein the predetermined amount of time T is based on the amount of time an inter-RAT handover instruction is normally expected after the initial time; and wherein the predetermined amount of time T further comprises setting the time interval with respect to a second time period corresponding to the expected time taken, after receiving a query, to receive at the user equipment device the instruction to execute the RAT handover and wherein the predetermined amount of time T is set to be greater than the second time period plus a threshold period.

* * * * *